(12) United States Patent
Long et al.

(10) Patent No.: US 12,520,774 B1
(45) Date of Patent: Jan. 13, 2026

(54) LED PLANTING UNIT AND PLANTING DEVICE THEREOF

(71) Applicant: Grow Pros Solutions, Chino, CA (US)

(72) Inventors: Zhihui Long, Chino, CA (US); Duo Zhang, Chino, CA (US)

(73) Assignee: Grow Pros Solutions, Chino, CA (US)

( * ) Notice: Subject to any disclaimer, the term of this patent is extended or adjusted under 35 U.S.C. 154(b) by 0 days.

(21) Appl. No.: 19/012,810

(22) Filed: Jan. 7, 2025

(51) Int. Cl.
| | |
|---|---|
| *A01G 9/24* | (2006.01) |
| *F21S 2/00* | (2016.01) |
| *F21S 4/28* | (2016.01) |
| *F21V 17/06* | (2006.01) |
| *F21V 21/005* | (2006.01) |
| *F21V 21/22* | (2006.01) |
| *F21V 29/503* | (2015.01) |
| *F21V 29/67* | (2015.01) |
| *F21V 29/83* | (2015.01) |
| *F21V 31/00* | (2006.01) |
| *F21Y 105/16* | (2016.01) |
| *F21Y 115/10* | (2016.01) |

(52) U.S. Cl.
CPC .............. *A01G 9/249* (2019.05); *F21S 2/00* (2013.01); *F21S 4/28* (2016.01); *F21V 17/06* (2013.01); *F21V 21/005* (2013.01); *F21V 21/22* (2013.01); *F21V 29/503* (2015.01); *F21V 29/673* (2015.01); *F21V 29/83* (2015.01); *F21V 31/005* (2013.01); *F21Y 2105/16* (2016.08); *F21Y 2115/10* (2016.08)

(58) Field of Classification Search
CPC ..... A01G 9/249; F21V 29/503; F21V 29/673; F21V 29/83; F21V 17/06; F21V 21/005; F21V 21/22; F21V 31/005; F21S 4/28; F21S 2/00; F21Y 2105/16; F21Y 2115/10
See application file for complete search history.

(56) References Cited

U.S. PATENT DOCUMENTS

| | | | |
|---|---|---|---|
| 11,965,647 B1 * | 4/2024 | Xu | F21V 23/007 |
| 2010/0172133 A1 * | 7/2010 | Liu | F21V 29/506 |
| | | | 362/249.02 |
| 2022/0128231 A1 * | 4/2022 | Chan | F21V 29/74 |

* cited by examiner

*Primary Examiner* — Bao Q Truong
(74) *Attorney, Agent, or Firm* — Zhigang Ma

(57) ABSTRACT

The LED planting unit includes an LED module with a base and a plurality of lighting beads being installed on the base, an integral tube made of a heat conduction metal material, with a hollow passageway and at least one row of air vents along a length direction thereof, each row of air vents including a plurality of air vents, the plurality of air vents in the same row arranged at intervals; the LED module installed on an outer surface of the tube and arranged along the length direction of the tube, the base in contact with the tube to conduct heat for the tube; the tube including first and second openings connected with each other through the passageway and respectively arranged at two ends of the tube, air flowing from the first opening into the passageway and then flowing out through the air vent and/or the second opening.

18 Claims, 7 Drawing Sheets

LED PLANTING UNIT AND PLANTING DEVICE THEREOF

TECHNICAL FIELD

The present disclosure relates to the field of plant cultivation devices, and especially relates to an LED planting unit and a planting device thereof.

BACKGROUND

Plants need light and carbon dioxide for performing photosynthesis during a cultivation process in order to grow. A growth rate and health of the plants are also related to environmental temperatures that surround the plants.

At present, for an indoor plant, a conventional method is to provide lighting for the indoor plant through LED planting lamps. The LED planting lamp is generally arranged above the indoor plant and faces the indoor plant, or the LED planting lamp is arranged at a root of the indoor plant and faces a crown of the indoor plant. A concentration of carbon dioxide in environments is mainly maintained through ventilation devices to keep the environments that surround the indoor plants to be ventilated, for example, a second opening of a draught fan that is configured to perform air blow is installed on a planting bracket or above the plant.

However, there are a plurality of technical problems in the related technologies mentioned above, for example:

firstly, when the plants are growing vigorously, the draught fan that is installed can't fully implement air circulation near the plants. For example, if the second opening is arranged on the planting bracket, the air circulation of the plants on the other side with a farther distance from the second opening decreases;

secondly, the LED planting lamp itself generates heat during converting electrical energy into light. After the heat is dissipated by the LED planting lamp, the heat is mainly concentrated near the plants. The air circulation of the planting plants away from the second opening decreases, so as to form a higher temperature area thereof. Such excessive temperature can also affect the growth of the plants; and thirdly, the LED planting lamp itself is also difficult to dissipate the heat due to a high ambient temperature thereof, which results in a low light conversion rate and a reduction in lifespan thereof.

SUMMARY

The technical problems to be solved: in view of the shortcomings of the related art, an objective of the present disclosure is to provide an LED planting unit which can solve technical problems that a low air flow is occurred in plants that are planted in the related art and a low heat dissipation efficiency is occurred in conventional LED planting lamps.

An LED planting unit according to an embodiment of the present disclosure includes:

an LED module that includes a base and a plurality of lighting beads installed on the base;

an integral tube made of a heat conduction metal material and including a hollow passageway and at least one row of air vents arranged on an outer surface of the tube along a length direction thereof, each row of air vents including a plurality of air vents, the plurality of air vents in the same row arranged at intervals;

the LED module installed on the outer surface of the tube and arranged along the length direction of the tube, the base in contact with the tube to conduct heat for the tube; and wherein the tube includes a first opening and a second opening connected with each other through the passageway and respectively arranged at two ends of the tube, and air that flows from the first opening and/or the second opening into the passageway flows out through the air vent.

In the present disclosure, the LED module is installed on the tube that is made of a thermally conductive metal material, so that heat generated by emitting light from the LED module is dissipated through the tube, thereby increasing a heat dissipation area of the LED module and improving a heat dissipation efficiency thereof, which is conducive to improving the technical problem of heat accumulation. Furthermore, the hollow tube has the passageway, when air flows in the passageway of the tube, air flows out through the plurality of air vents that is set at intervals, thereby implementing uniform air flow around the plants that are planted. And then, as the tube is an integral structure, it is convenient to produce a suitable length according to a size of a planting area during production, thereby making it easy to customize the size thereof. Finally, the LED planting units of the present disclosure can also be expanded in sizes according to quantities, for example, when there are two LED planting units, the two passageways of the two LED planting units are connected with each other, that is, the second opening of one LED planting unit is connected to the first opening of the other LED planting unit. In this way, the flowing air from the first opening of one LED planting unit can flow through the two passageways of the two LED planting units in sequence, and then flow out from the air vents that are connected with the passageways, which can achieve air flow within a larger length range thereof.

A planting device according to an embodiment of the present disclosure includes:

a draught fan, wires and at least one LED planting unit mentioned above.

When the at least one LED planting unit includes only one LED planting unit, the draught fan is installed at the first portion of the LED planting unit, the second portion of the LED planting unit is sealed off. The draught fan blows air towards the first opening of the LED planting unit, the second opening of the LED planting unit is sealed off, and the wire is configured to supply power to the LED module within the LED planting unit. The flowing air in the passageway flows out through the air vents that are arranged at intervals, thereby achieving uniform air flow thereof.

When the at least one LED planting unit includes a plurality of LED planting units, each of the plurality of LED planting units including a first portion and a second portion, the plurality of LED planting units respectively taken as a first unit, a second unit up to an N-th unit, wherein N is an integer greater than or equal to 1; the plurality of LED planting units successively connected end-to-end, the passageways of the plurality of LED planting units connected with each other, and the draught fan installed at the first portion of the first unit and the second portion of the N-th unit sealed off; and wherein the draught fan is installed on the first portion of the first unit, each LED planting unit connected with the wires, two adjacent LED planting units connected by the wires, the plurality of LED modules electrically connected by the wires, and the wires configured to output electrical signals to power and control the plurality of LED modules.

In the present disclosure, the draught fan blows air towards the passageway so that the flowing air flows out through the air vent, which can evenly circulate the air that is surrounded. In addition, while blowing the air, the heat of the LED module is dissipated through the tube of the LED planting unit, thereby cleverly combining circulating air that blows by the draught fan and heat dissipation of the LED module, so as to solve the technical problems in the related art. At the same time, the plurality of LED planting units can be connected in series to connect the plurality of passageways, which can expand a length of the entire planting device according to specific requirements and meet requirements of different planting sizes. Furthermore, by using a single wire to connect the plurality of LED modules, it is possible to adjust lighting parameters of the plurality of LED modules through a single controller, for example, after being adjusted by only one controller, the plurality of LED modules can have the same light intensity and light time, so that an adjustment process is convenient and simple, and there is no need to individually adjust and control the plurality of LED modules, thereby achieving an efficient control mode thereof.

A planting device according to another embodiment of the present disclosure includes:

a plurality of draught fans, wires and a plurality of LED planting units mentioned above, wherein the number of the LED planting units is the same as that of the draught fans.

similarly, the draught fan is configured to blow air to form airflow; each of the plurality of LED planting units including a first portion and a second portion, the plurality of LED planting units respectively taken as a first unit, a second unit up to an N-th unit, wherein N is an integer greater than or equal to 1; the plurality of LED planting units successively connected end-to-end; and wherein the draught fan is installed at the first portion, each of the plurality of draught fans corresponding to each first portion one-to-one and configured to blow air towards the passageway through the first opening, a wire connected to each LED planting unit, two adjacent LED planting units connected by the wire, the plurality of LED modules electrically connected to the plurality of draught fans by the wires, and the wires configured to output electrical signals to supply power for the plurality of LED modules and the plurality of draught fans, and control the plurality of LED modules.

In the present disclosure, each LED planting unit is equipped with one draught fan that is configured to blow air into the passageway of the LED planting unit; the plurality of draught fans are connected by the wires, and the plurality of LED modules are also connected by the wires. One power supply can independently control operation or shutdown of the plurality of draught fans, thereby achieving differentiated operation or shutdown of the plurality of draught LED planting units. By using a single wire to connect the plurality of LED modules, it is possible to adjust lighting parameters of the plurality of LED modules through a single controller, for example, after being adjusted by only one controller, the plurality of LED modules can have the same light intensity and light time, so that an adjustment process is convenient and simple, and there is no need to individually adjust and control the plurality of LED modules, thereby achieving an efficient control mode thereof.

DETAILED DESCRIPTION

Reference will now be made in detail to embodiments, examples of which are illustrated in the accompanying drawings.

Figure 1:
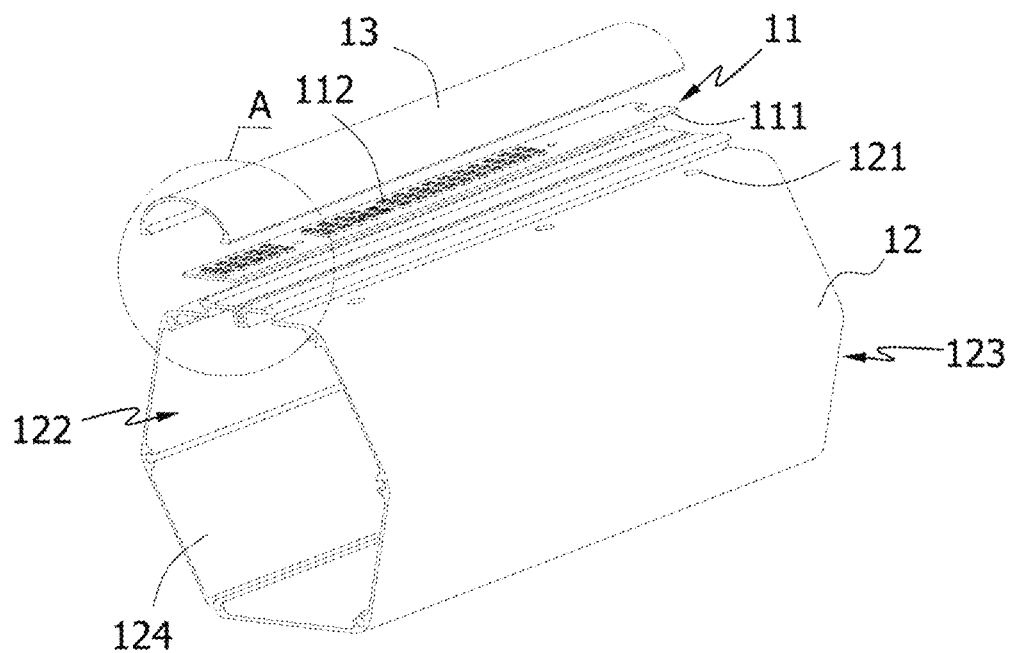
FIG. 1 is an exploded, schematic view of an LED planting unit in accordance with an embodiment of the present disclosure.
Figure 2:
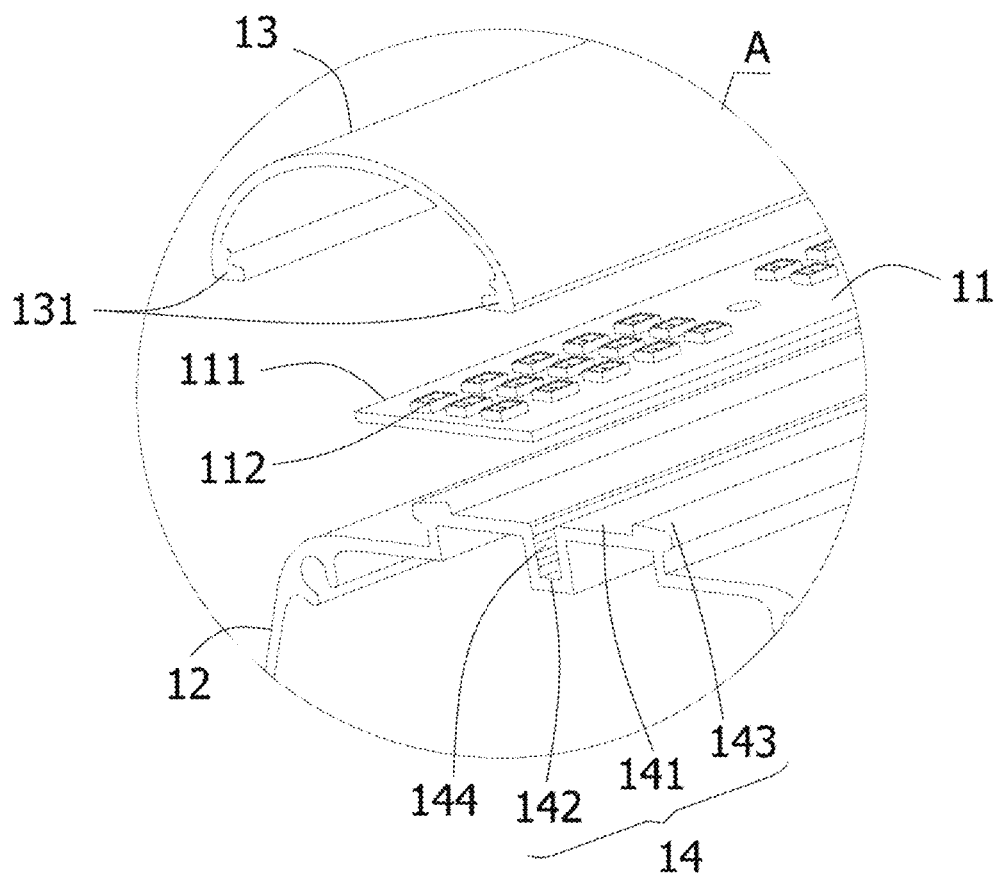
FIG. 2 is a partial enlarged view of FIG. 1.

Referring to FIG. 1 and FIG. 2, FIG. 1 is an exploded, schematic view of an LED planting unit 100 in accordance with an embodiment of the present disclosure. The LED planting unit 100 includes: an LED module 11, a tube 12 and a transparent cover 13.

The LED module 11 includes a base 111 and a plurality of lighting beads 112 installed on the base 111. The base 111 is configured to support the plurality of lighting beads 112 which is welded onto the base 111. The base 111 is configured to supply power for the plurality of lighting beads 112 and also serves as a heat dissipation function thereof.

The LED module 11 is in a shape of a long strip and compatible with a size of the tube 12, so that the LED module 11 can be easily installed on the tube 12. Specifically, the tube 12 is a thermally conductive metal material with an integrated molding structure. When the LED module 11 is installed on the tube 12, the tube 12 can transfer heat of the LED module 11, thereby improving a heat dissipation effect thereof.

Furthermore, the tube 12 includes a hollow passageway 124 and at least one row of air vents 121 arranged on an outer surface of the tube 12 along a length direction thereof, each row of air vents 121 including a plurality of air vents 121, the plurality of air vents 121 in the same row arranged at intervals, of course, the plurality of air vents 121 in the same row can be arranged at equal intervals.

When there is flowing air in the passageway 124 of the tube 12, the air flows out through the plurality of air vents 121, so that a uniform air flow heat exchange channel is formed near the tube 12, thereby preventing heat accumulation thereof.

The LED module 11 is installed on the outer surface of the tube 12 and arranged along the length direction of the tube 12, and the base 111 is in contact with the tube 12 to conduct heat for the tube 12.

The tube 12 includes a first opening 122 and a second opening 123 connected with each other through the passageway 124 and respectively arranged at two ends of the tube 12, and air that flows from the first opening 122 into the passageway 124 flows out through the air vent 121 and/or the second opening 123.

In the present disclosure, when the air flows in the passageway 124 of the tube 12, on the one hand, the air can flow out of the air vent 121, so as to perform air heat exchange around the air vent 121; on the other hand, because the air vent 121 is arranged on the tube 12, when air flows from the air vent 121 and the passageway 124, heat generated from the tube 12 can be quickly dissipated out. The tube 12 itself is made of a thermally conductive metal material, which can dissipate heat that is generated by the LED module 11 through an air cooling way after the tube 12 absorbs the heat from the base 111. Such design allows the air near the plants to flow, thereby increasing an oxygen content of carbon dioxide in the air around the plants, increasing photosynthesis of the plants and improving a heat dissipation performance of the LED module 11.

The air flows out from the first opening 122 to the air vent 121 and the second opening 123. A flowing length of the air is relatively long so that it can dissipate heat from a longer tube 12, thereby ensuring that a temperature of the entire tube 12 is basically consistent for preventing heat accumulation thereof, which is not only beneficial for reducing a temperature of the surrounding environment, but also for an operation of the LED module 11.

In the present disclosure, the air vent 121 is arranged on a side of the LED module 11 or on both sides of the LED module 11 along a length direction thereof, and an air outlet direction of the air vent 121 faces a light emission direction of the LED module 11. The LED module 11 can blow air towards a crown of the plant while providing light for the plant, thereby increasing the light and a concentration of carbon dioxide at the crown, which is beneficial for the growth of the plant.

In the present disclosure, the LED planting unit 100 can be arranged between two rows of plants that are planted, and the air vents 121 arranged on both sides of the LED module 11 can blow air to the two rows of planting plants, respectively. That is to say, only one LED planting unit 100 can achieve a purpose of lighting the plants that are planted on both sides, exchanging air near the planting plants and dissipating heat thereof, which can save a space for arranging lighting devices, heat dissipation and ventilation devices thereof.

In the present disclosure, each LED planting unit 100 can correspond to a plurality of LED modules 11, such as two LED modules 11 or three LED modules 11. The plurality of LED modules 11 are distributed and arranged on the outer surface of the tube 12, for example, the plurality of LED modules 11 is arranged in parallel, the plurality of LED modules 11 is arranged along the length direction of the tube 12 with the same interval, or distributed along the circumference of the tube 12. Such setting way is conducive to increasing light intensity of a space where the tube 12 is located, which is beneficial for the growth of the plants.

Similarly, when there is the plurality of LED modules 11 arranged on the LED planting unit 100, there is also a plurality of rows of air vents 121 arranged thereon, and each row of air vents 121 at least correspond to one of the plurality of LED modules 11. Each row of air vents 121 is located near one of the plurality of LED modules 11 and extends along the length direction of the tube 12. Preferably, each LED module 11 corresponds to two rows of air vents 121, and one row of air vents 121 is arranged on one side of the LED module 11 and the other row of air vents 121 is arranged on the other side of the LED module 11. The two rows of air vents 121 that are arranged on both sides of the LED module 11 can also further improve air flow near the tube 12.

In the present disclosure, a cross-sectional shape of the tube 12 can be set according to actual needs, such as a circular structure or a polygonal structure. Moreover, positions of the air vents 121 that are arranged on the tube 12 can also be set according to actual needs, for example, the air vents 121 are arranged on both sides of the LED planting unit 100, or at a position where the LED planting unit 100 faces the planting plants, as long as the air vents 121 can improve the air flow of the surrounding environment.

Figure 3A:
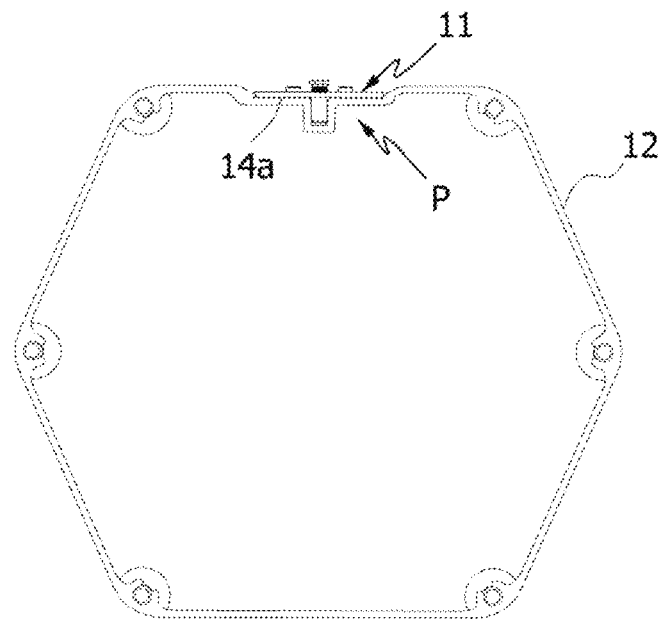
FIG. 3A and FIG. 3B are installation schematic views of an LED module of the LED planting unit of FIG. 1.
Figure 3B:
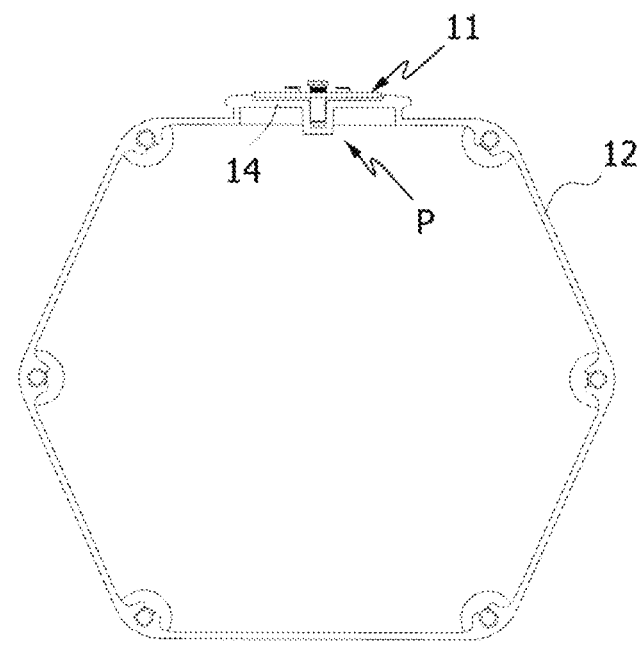

Referring to FIG. 3A and FIG. 3B, in the present disclosure, an installation position P is arranged on the outer surface of the tube 12 and extends along the length direction of the tube 12 and configured to install the LED module 11. The installation position P is a part of the tube 12, or the installation position P is a concave portion 14a or an installation portion 14 formed on the tube 12; the concave portion 14a or the installation portion 14 extends along the length direction of the tube 12.

Figure 4:
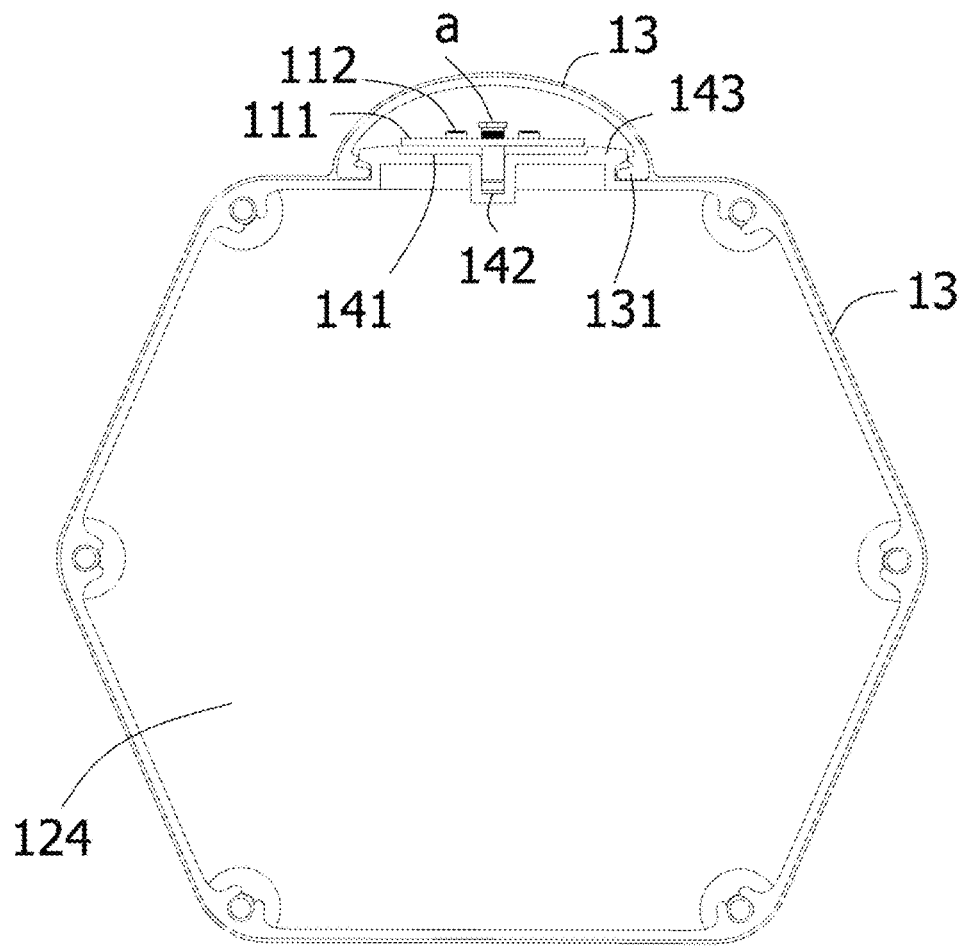
FIG. 4 is a cross-sectional schematic view of the LED planting unit of FIG. 1.

In the present disclosure, it is preferred that the tube 12 is a hexagonal cross-sectional shape. In this way, the installation portion 14 can be arranged at a position of the tube 12 that corresponds to an edge of a hexagonal cross-section of the tube 12. The installation portion 14 is configured to install the base 111 of the LED module 11. Referring to FIG. 4, specifically, the installation portion 14 is arranged on the outer surface of the tube 12 and extends along the length direction of the tube 12. The installation portion 14 includes: a convex surface 141, a concave recess 142 and a bar 143.

The convex surface 141 protrudes out of the outer surface of the tube 12 and is configured to install the base 111. The concave recess 142 is arranged on the middle of the convex surface 141 and arranged along the length direction of the tube 12, wherein the concave recess 142 is concave towards the interior of the tube 12. There are a pair of bars 142 included in the installation portion 14, and the pair of bars 142 are respectively located on both edges of the convex surface 141, extend along the length direction of the tube 12 and protrude from edges in a width direction of the convex surface 141.

Referring to FIG. 4, the transparent cover 13 is connected to the tube 12, and the LED module 11 is received in the transparent cover 13. The transparent cover 13 is arranged along the length direction of the tube 12 and includes two ribs 131 arranged on both sides thereof and extending along the length direction thereof, the two ribs 131 respectively clamped with the pair of bars 143, so as to seal the LED module 11 inside the transparent cover 13.

When there are a plurality of LED modules 11, there are also a plurality of transparent covers 13, and each of the plurality of transparent covers 13 corresponds to one of the plurality of LED modules 11. That is to say, one transparent cover 13 is wrapped around one LED module 11, or one transparent cover 13 is included in two or more transparent covers 13. The air outlet 121 is located on the outside of the transparent cover 13, and the transparent cover 13 does not affect air flowing from the air outlet 121.

In the present disclosure, the base 111 is fixed in the concave recess 142 by screws a and further fixed with the tube 12, and a plurality of fixing recesses 144 extending along a length direction of the concave recess 142 is provided on a sidewall of the concave recess 142, the screws a and the plurality of fixing recesses 144 are in threaded connection so as to fix the screws a within the plurality of fixing recesses 144.

In the present disclosure, the base 111 can be conveniently fixed in the concave recess 142. As the base 111 is set along the length of the convex surface 141, the length of the base 111 is adapted to that of the tube 12, for example, when the length of the tube 12 is 3 m, the base 111 is also set to 3 m, and the length of the concave recess 142 is also 3 m. In this way, when the LED module 11 is fixed on the tube 12, it can be fixed to the concave recess 142 at any position of the base 111 by the screws, thereby making it convenient to adapt to various lengths thereof.

After the ribs 131 of the transparent cover 13 are clamped with the bars 143, the transparent cover 13 is fixed on the tube 12. The transparent cover 13 is made of an elastic plastic material, which can be easily fixed and disassembled through an elastic structure, and can ensure firm fixation thereof. A preferred method that a sealing strip or a sealing silicone is installed at the position that the rib 131 of the transparent cover 13 is connected with the tube 12, which can seal the transparent cover 13 and thus play a waterproof role thereof.

In the present disclosure, the LED module 11 is installed on the tube 12 that is made of a thermally conductive metal material, so that heat generated by emitting light from the LED module 11 is dissipated through the tube 12, thereby increasing a heat dissipation area of the LED module 11 and improving a heat dissipation efficiency thereof, which is conducive to improving the technical problem of heat accumulation. Furthermore, the hollow tube 12 has the passageway 124, and when air flows in the passageway 124 of the tube 12, air flows out through the plurality of air vents 121 that is set at intervals, thereby implementing uniform air flow around the plants. And then, as the tube 12 is an integral structure, it is convenient to produce a suitable length according to a size of a planting area during production, thereby making it easy to customize the size thereof. Finally, the LED planting units 100 of the present disclosure can also be expanded in sizes according to quantities, for example, when there are two LED planting units 100, the two passageways 124 of the two LED planting units 100 are connected with each other, that is, the second opening 123 of one LED planting unit 100 is connected to the first opening 122 of the other LED planting unit 100. In this way, the flowing air from the first opening 122 of one LED planting unit 100 can flow through the two passageways 124 of the two LED planting units 100 in sequence, and then flow out from the air vents 121 that are connected with the passageways 124, which can achieve air flow in a larger length range thereof.

The present disclosure also discloses three planting devices 200 with different structures, which are respectively taken as a first embodiment, a second embodiment and a third embodiment.

The first embodiment of the present disclosure

Figure 5:
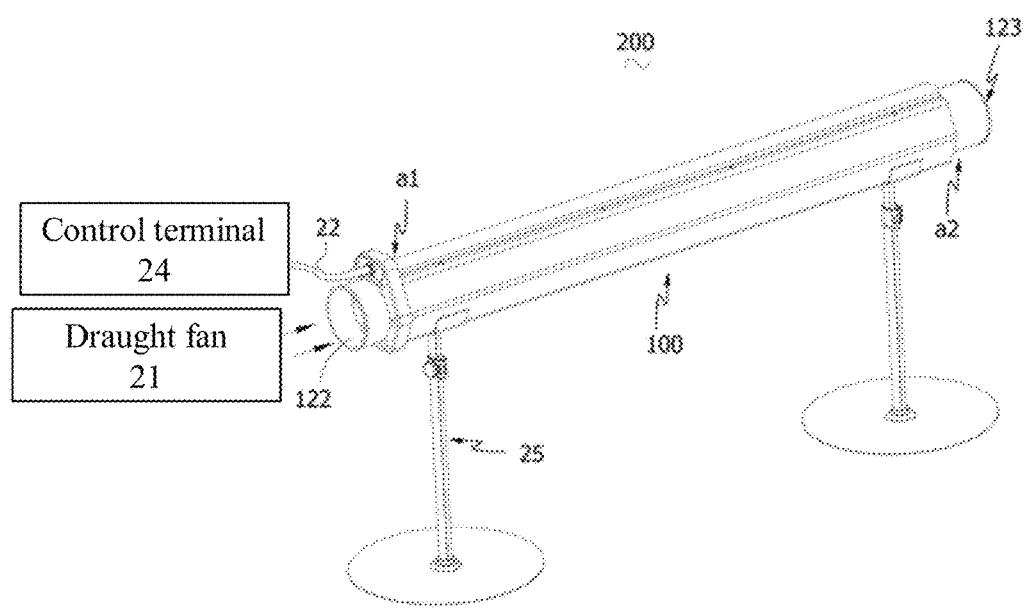
FIG. 5 is a schematic view of a planting device in accordance with an embodiment of the present disclosure.
Figure 6:
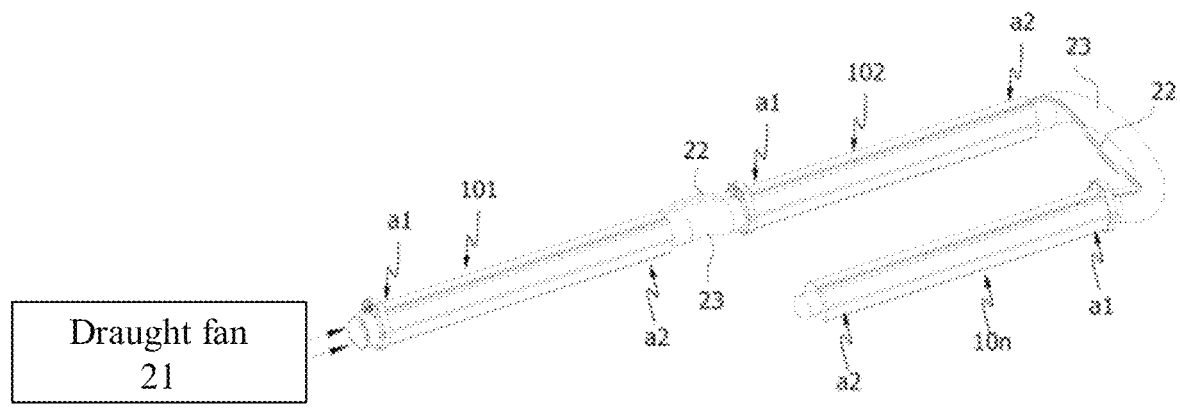
FIG. 6 is a schematic view of a plurality of LED planting units connected in series of the present disclosure.
Figure 7:
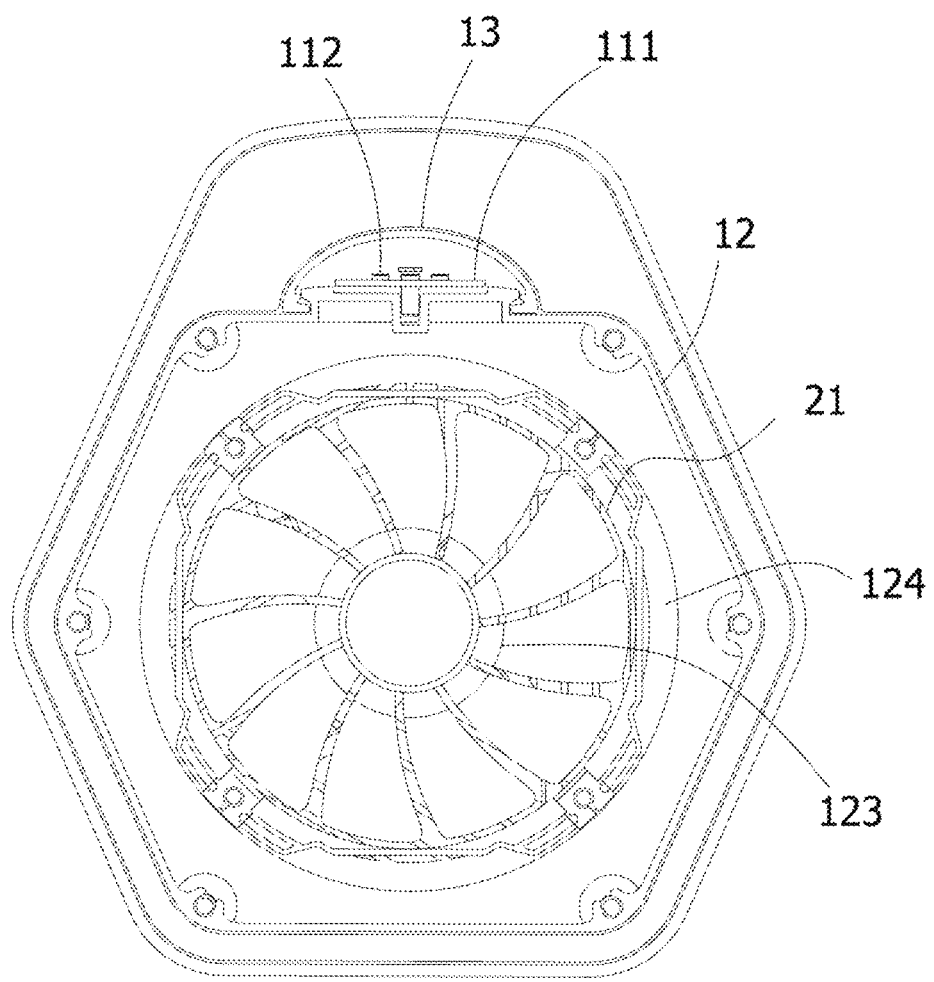
FIG. 7 is a cross-sectional schematic view of the planting device of the present disclosure.

Referring to FIG. 5 to FIG. 7, a planting device 200 according to the first embodiment of the present disclosure is provided and includes: at least one draught fan 21, a plurality of wires 22 and at least one LED planting unit 100 as described above. Each of the at least one LED planting unit 100 includes a first portion a1 and a second portion a2.

When the at least one LED planting unit 100 includes only one LED planting unit 100, the draught fan 21 is installed at the first portion a1 of the LED planting unit 100, and the second portion a2 of the LED planting unit 100 is sealed off. The draught fan 21 blows air towards the first opening 122 of the LED planting unit 100, the second opening 123 of the LED planting unit 100 is sealed off, and the wire 22 is configured to output electrical signals to supply power to the LED module 11 within the LED planting unit 100. The flowing air in the passageway 124 flows out through the air vents 121 that are set at intervals, thereby achieving uniform air flow thereof.

When there are a plurality of LED planting units 100, the plurality of LED planting units 100 is respectively taken as a first unit 101, a second unit 102 up to an N-th unit 10n, wherein N is an integer greater than or equal to 1. The plurality of LED planting units 100 is successively connected end-to-end, the passageways 124 of the plurality of LED planting units 100 are connected with each other, and the draught fan 21 is installed at the first portion a1 of the first unit 101 and the second portion a2 of the N-th unit 10n is sealed off.

The draught fan 21 is installed on the first portion 122 of the first unit 101, each LED planting unit 100 connected with the wires 22, two adjacent LED planting units 100 connected by the wires 22, the plurality of LED modules 11 electrically connected by the wires 22, and the wires 22 configured to output electrical signals to power and control the LED modules 11.

In the present disclosure, the draught fan 21 blows air towards the passageway 124 so that the flowing air flows out through the air vent 121, which can evenly circulate surrounding air. In addition, while blowing the air, heat of the LED module 11 is dissipated through the tube 12 of the LED planting unit 100, thereby cleverly combining circulating air that blows by the draught fan 21 and heat dissipation of the LED module 11, so as to solve the technical problems in the related art. At the same time, the plurality of LED planting units 100 can be connected in series to connect the plurality of passageways 124, which can expand the length of the entire planting device 200 according to specific requirements and meet requirements of different planting sizes. Furthermore, by using the wires 22 to connect the plurality of LED modules 11 in turn, it is possible to adjust lighting parameters of the plurality of LED modules 11 through a single controller, for example, after being adjusted by only one controller, the plurality of LED modules 11 can have the same light intensity and light time, so that an adjustment process is convenient and simple, and there is no need to individually adjust and control the plurality of LED modules 11, thereby achieving an efficient control mode thereof.

In the first embodiment of the present disclosure, the two adjacent LED planting units 100 are connected by a flexible connecting tube 23, the flexible connecting tube 23 configured to interconnect the two passageways 124 of the two adjacent LED planting units 100.

At this time, only one draught fan 21 blows air to one of the plurality of LED planting units 100, and the air that flows in the passageway 124 can successively flow through the plurality of passageways 124 of the plurality of LED planting units 100, achieving heat dissipation of the plurality of LED modules 11 and air flow of the plurality of LED planting units 100, so as to realize functions of heat dissipation and ventilation thereof.

A specific connection is: the second portion a2 of an M-th unit is connected to the first portion a1 of an (M+1)-th unit through the flexible connecting tube 23, so that the second opening 123 of the M-th unit is connected with the first opening 122 of the (M+1)-th unit, wherein M+1≤N. That is, the second portion a2 of one of the plurality of LED planting units 100 is connected to the first portion a1 of a next adjacent LED planting unit 100 through the flexible connecting tube 23, so that the second opening 123 of the LED planting unit 100 is conductive with the first opening 122 of the next adjacent LED planting unit 100.

That is to say, when there are the plurality of LED planting units 100, the first opening 122 of a next LED planting unit 100 is connected to the second opening 123 of a previous LED planting unit 100 through the flexible connecting tube 23. The first opening 122 of the first LED planting unit 100 is connected to the draught fan 21 or air is blown by the draught fan 21 towards the first opening 122 of the first LED planting unit 100, and the second opening 123 of the last LED planting unit 100 is sealed off. Such structure allows all the air inside the passageways 124 to be blown out from the plurality of air vents 121. An air flow rate of one draught fan 21 is equal to a sum of air flow rates of the plurality of air vents 121, thereby ensuring that the air blown out from the plurality of air vents 121 is an air blowing speed and improving an air exchange rate in the surrounding environment thereof.

The planting device 200 further includes a control terminal 24 electrically connected to the LED module 11 of the first unit 101, and configured to control the plurality of LED modules 11 through the wires 22, respectively. In this way, only one control terminal 24 can provide power and control to the plurality of planting units 100, which is convenient and fast.

Figure 8:
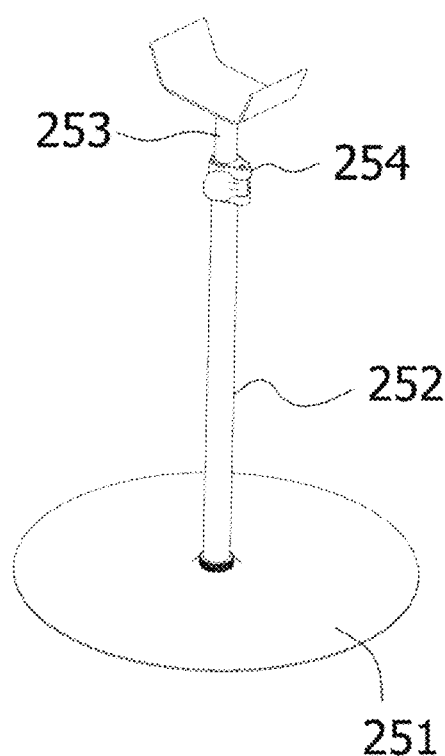
FIG. 8 is a schematic view of an adjusting bracket of the planting device of FIG. 7.
Figure 9:
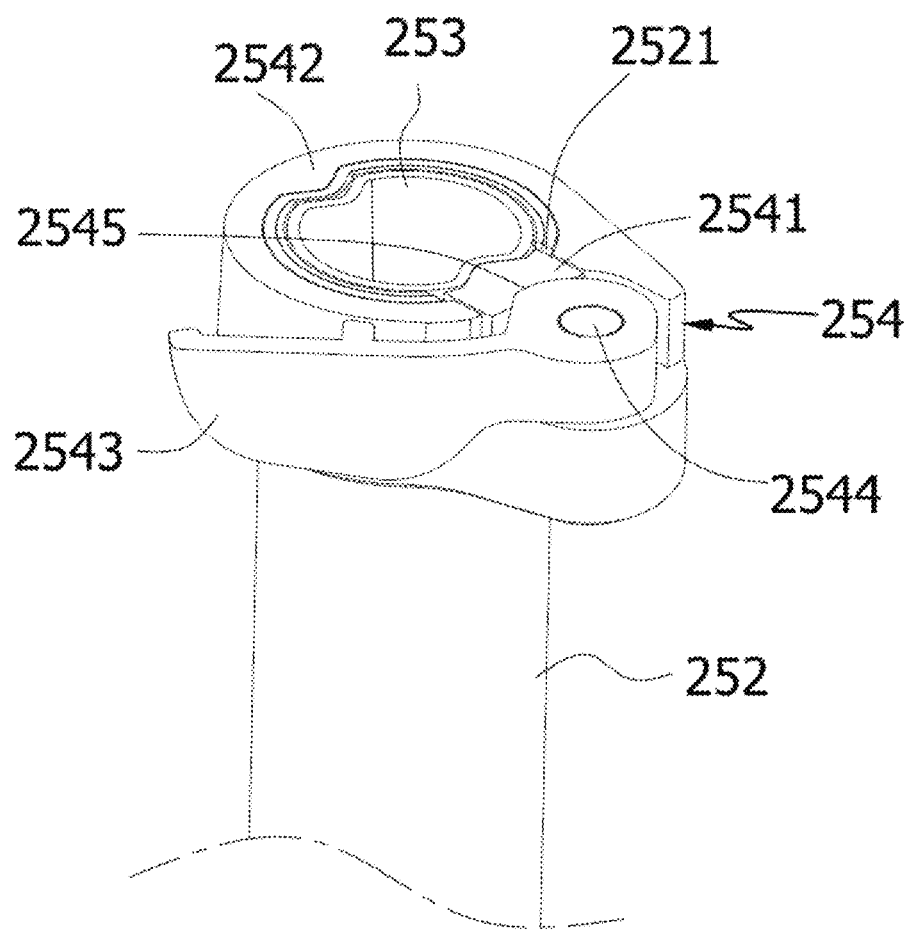
FIG. 9 is a cross-sectional view of FIG. 7.

Referring to FIG. 5, FIG. 8 and FIG. 9, in the first embodiment of the present disclosure, the planting device 200 further includes a plurality of adjusting brackets 25, wherein each LED planting unit 100 is placed on at least two adjusting brackets 25, the two adjusting brackets 25 configured to adjust a height of the LED planting unit 100 to adapt to heights of the plants that are planted.

The adjusting bracket 25 includes: a seat 251, a supporting post 252, a telescopic rod 253 and a locking member 254.

The supporting post 252 is fixed on the seat 251, an end of the supporting post 252 connected to the planting device 200 or the LED planting unit 100. The supporting post 252 is a hollow structure and an opening 2521 is arranged on a sidewall of the supporting post 252. The telescopic rod 253 is sleeved inside the supporting post 252 and slides relative to the supporting post 252. The locking member 254 is sleeved around the telescopic rod 253 and in contact with the telescopic rod 253. The locking member 254 is configured to limit and fix the telescopic rod 253 on the supporting rod 252.

The locking member 254 includes: a fixing block 2541, an outer frame 2542 and an adjusting rod 2543.

The fixing block 2541 is received in the opening 2521, the outer frame 2542 sleeved around the supporting post 252 and including a rotating shaft 2544 arranged opposite to the opening 2521, wherein a length direction of the rotating shaft 2544 is the same as that of the supporting post 252. The adjusting rod 2543 is rotatably connected to the rotating shaft 2544, the adjusting rod 2543 including a convex portion 2545 formed close to the opening 2521, and the fixing block 2541 arranged between the telescopic rod 253 and the convex portion 2545.

When the adjusting rod 2543 rotates, a) the convex portion 2545 abuts against the fixing block 2541 to press the fixing block 2541 onto the telescopic rod 253 so as to fix the telescopic rod 253; or b) the convex portion 2545 is far away from the fixing block 2541 so that the fixing block 2541 releases from the telescopic rod 253, so as to move the telescopic rod 253 relative to the adjusting rod 2543, to further adjust a position of the telescopic rod 253.

When the adjusting bracket 25 of the present disclosure is in operation, first rotating the adjusting rod 2543 to move the convex portion 2545 away from the fixing block 2541, and the fixing block 2541 releases from the telescopic rod 253. And then, manually stretching or compressing the telescopic rod 253 to move the telescopic rod 253 in the supporting post 252. After the telescopic rod 253 moves to an appropriate position, manually rotating the adjusting rod 2543 again to make the convex portion 2545 abut against the fixing block 2541. The fixing block 2541 is pressed onto the telescopic rod 253 to fix the telescopic rod 253 relative to the supporting post 252, thereby achieving to adjust a height of the telescopic rod 253.

The present disclosure is provided to adjust the height of the LED planting unit 100 or the planting device 200 by adjusting the adjusting bracket 25, so that it can ensure that a light range and the air blown out from the air vent 121 corresponding to the height of the plants, thereby improving the photosynthesis efficiency of the plants and enhancing their growth thereof.

The second embodiment of the present disclosure

Figure 10:
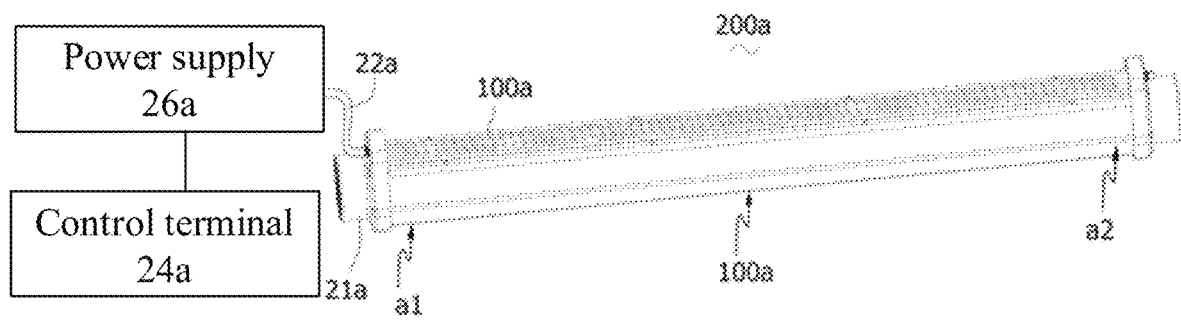
FIG. 10 is a schematic view of a planting device in accordance with another embodiment of the present disclosure.
Figure 11:
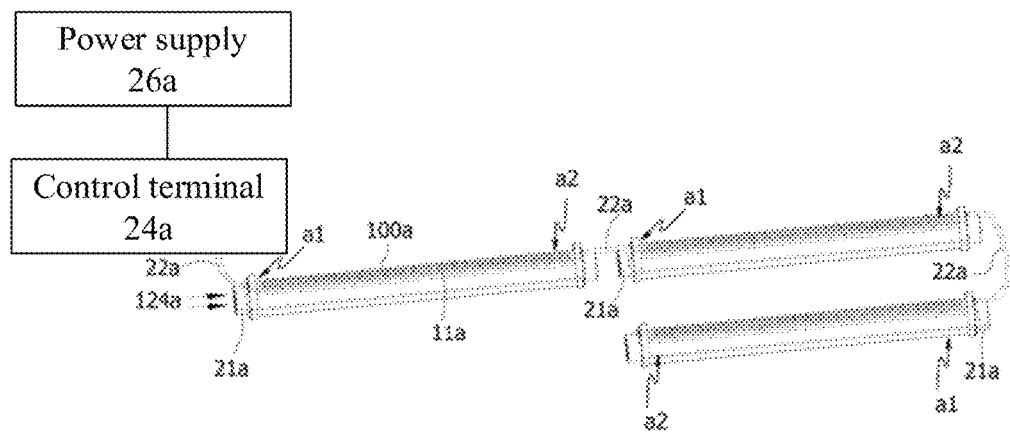
FIG. 11 is a schematic view of a plurality of LED planting units connected in accordance with another embodiment of the present disclosure.

Referring to FIG. 10 and FIG. 11, differences between the second embodiment and the first embodiment are that: in the second embodiment, there are a plurality of draught fans 21a and a plurality of LED planting units 100, each of the plurality of draught fans 21a corresponding to connect to one of the plurality of LED planting units 100a, and the planting device 200a further includes a power supply 26a electrically connected to the plurality of draught fans 21a.

Specifically, the number of the LED planting units 100a is the same as that of the draught fans 21a.

The draught fan 21a is installed at the first portion a1, each draught fan 21a corresponding to connect to each first portion a1 one-to-one, a wire 22a connected to each LED planting unit 100a, two adjacent LED planting units 100a connected by the wire 22, the plurality of LED modules 11a electrically connected to the plurality of draught fans 21a by the wires 22a, and the wire 22a configured to supply power for the plurality of LED modules 11a and the plurality of draught fans 21a, and output electrical signals to control the plurality of LED modules 11a.

Referring to FIG. 10, in the present disclosure, each LED planting unit 100a is provided one draught fan 21a to blow air towards the passageway 124a of the LED planting unit 10a. The plurality of draught fans 21a is connected by the wires 22a, and the plurality of LED modules 11a is also connected by the wires 22a. Only one power supply 26a is provided to independently control operation or shutdown of the plurality of draught fans 21a, thereby achieving differentiated operation or shutdown of the plurality of LED planting units 100a. The plurality of LED modules 11a is connected by a single wire 22a, it is possible to adjust lighting parameters of the plurality of LED modules 11a through a single control terminal 24a. For example, after adjusting by only one control terminal 24a, the plurality of LED modules 11a can have the same lighting intensity and lighting time, so that an adjustment process is convenient and simple, and there is no need to individually adjust and control the plurality of LED modules 11a, thereby achieving an efficient control way thereof.

The third embodiment of the present disclosure

Figure 12:
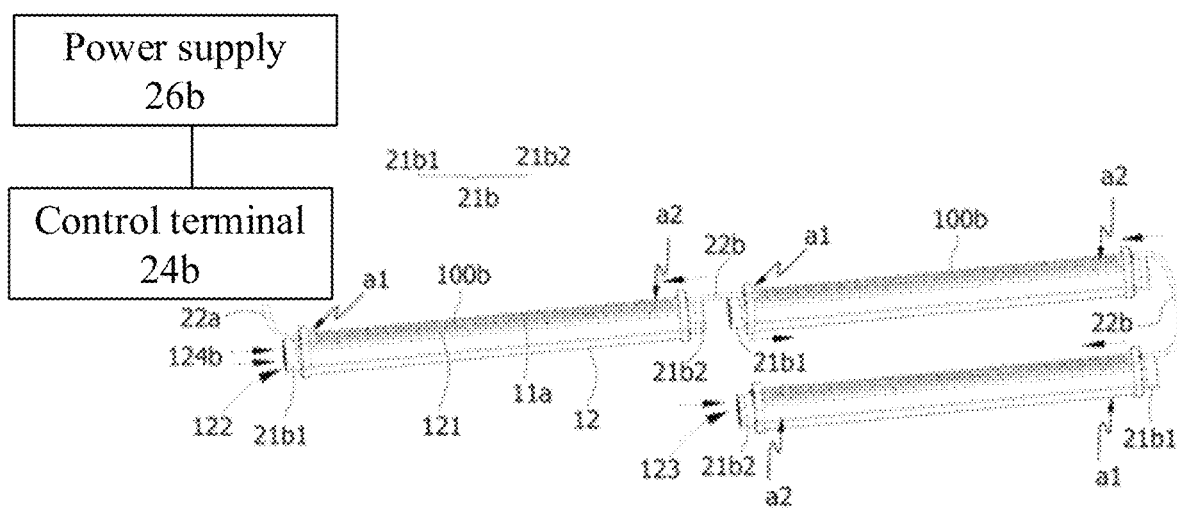
FIG. 12 is a schematic view of a plurality of LED planting units of another embodiment of the present disclosure, which is shown the plurality of LED planting units first connected in parallel, and then connected in series.

Referring to FIG. 12, differences between the third embodiment and the second embodiment are that: in the third embodiment, there are a plurality of draught fans 21*b* arranged in pairs, each pair of draught fans 21*b* having two draught fans 21*b*1, 21*b*2, and each pair of draught fans 21*b* is respectively arranged at both ends of the planting unit 100*b*, namely the first portion a1 and the second portion a2. Each pair of draught fans 21*b*1, 21*b*2 blows air towards the passageway 124*b* through the first opening 122 and the second opening 123, respectively.

In the third embodiment of the present disclosure, the number of draught fans 21*b* is twice the number of LED planting units 100*b*.

In the third embodiment of the present disclosure, a plurality of pairs of draught fans 21*b* is connected by the wires 22*b*, and the plurality of LED modules 11*b* is also connected by the wires 22*b*. Only one power supply 26*b* is provided to independently control operation or shutdown of the plurality of pairs of draught fans 21*b*1, 21*b*2, thereby achieving differentiated operation or shutdown of the plurality of LED planting units 100*b*. In particular, only one power supply 6*b* can control the pair of draught fans 21*b*1, 21*b*2 installed on the same LED planting unit 10*b* to rotate in opposite directions, that is, one draught fan 21*b*1 rotates in a forward direction and blows air towards the passageway 124*b*, and the other draught fan 21*b*2 rotates in a reverse direction when being installed in a forward direction, or rotates in the forward direction when being installed in the reverse direction, and also blows air towards the passageway 124*b*. In this case, the air blown into the passageway 124*b* is discharged through the air vent 121, so that an air flow velocity in the air vent 121 is further increased, which can improve the heat dissipation of the tube 12, increase the air flow near the LED planting unit 100*b*, and improve the concentration of carbon dioxide near the plants, thereby being conducive to improving the growth efficiency of the plants.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED planting unit comprising an LED module which comprises a base and a plurality of lighting beads installed on the base, wherein the LED planting unit comprises:
    an integral tube made of a heat conduction metal material and comprising a hollow passageway and at least one row of air vents arranged on an outer surface of the tube along a length direction thereof, each row of air vents comprising a plurality of air vents, the plurality of air vents in the same row arranged at intervals;
    the LED module installed on the outer surface of the tube and arranged along the length direction of the tube, the base in contact with the tube to conduct heat for the tube; and wherein
    the tube comprises a first opening and a second opening connected with each other through the passageway and respectively arranged at two ends of the tube, and air that flows from the first opening and/or the second opening into the passageway flows out through the air vent.

2. The LED planting unit as claimed in claim 1, wherein the at least one row of air vents is located on at least one side of the LED module, and the LED module corresponds to the at least one row of air vents, wherein a wind direction of the at least one row of air vents faces towards a light emission direction of the LED module.

3. The LED planting unit as claimed in claim 1, wherein an installation position is arranged on the outer surface of the tube and extends along the length direction of the tube, the installation position configured to install the LED module; and wherein the installation position is a part of the tube, or the installation position is a concave portion or an installation portion formed on the tube, the concave portion or the installation portion extending along the length direction of the tube.

4. The LED planting unit as claimed in claim 3, wherein the installation portion comprises:
    a convex surface protruding from the outer surface of the tube and configured to install the base;
    a concave recess arranged on the middle of the convex surface and arranged along the length direction of the tube, wherein the concave recess faces the inside of the tube; and
    a pair of bars respectively located on both edges of the convex surface, extending along the length direction of the tube and protruding from edges in a width direction of the convex surface.

5. The LED planting unit as claimed in claim 4, wherein the LED planting unit further comprises a transparent cover connected to the tube and set along the length direction of the tube, and the LED module arranged inside the transparent cover; and wherein
    the transparent cover comprises two ribs arranged on both sides thereof and extending along the length direction thereof, the two ribs respectively clamped with the pair of bars, so as to seal the LED module inside the transparent cover.

6. The LED planting unit as claimed in claim 5, wherein there are a plurality of LED modules and a plurality of transparent covers comprised in the LED planting unit, each of the plurality of LED modules corresponding to each of the plurality of transparent covers.

7. A planting device comprising:
    a draught fan configured to blow air to form airflow;
    at least one LED planting unit, each of the at least one LED planting unit comprising an LED module which comprises a base and a plurality of lighting beads installed on the base, wherein the at least one LED planting unit further comprises:
    an integral tube made of a heat conduction metal material and comprising a hollow passageway and at least one row of air vents arranged on an outer surface of the tube along a length direction thereof, each row of air vents including a plurality of air vents, the plurality of air vents in the same row arranged at intervals;
    the LED module installed on the outer surface of the tube and arranged along the length direction of the tube, the base in contact with the tube to conduct heat for the tube; and wherein
    the tube comprises a first opening and a second opening connected with each other through the passageway and respectively arranged at two ends of the tube, and air that flows from the first opening into the passageway flows out through the air vent and/or the second opening;

a first portion; and a second portion; wherein when the at least one LED planting unit comprises only one LED planting unit, the draught fan is installed at the first portion of the LED planting unit, the second portion of the LED planting unit is sealed off, and the draught fan blows air towards the first opening of the LED planting unit; and wherein when the at least one LED planting unit comprises a plurality of LED planting units, the plurality of LED planting units respectively taken as a first unit, a second unit up to an N-th unit, wherein N is an integer greater than or equal to 1; the plurality of LED planting units successively connected end-to-end, the passageways of the plurality of LED planting units connected with each other, the draught fan installed at the first portion of the first unit, and the second portion of the N-th unit sealed off; and wherein the draught fan blows air towards the first opening of the first unit and wires are connected to each of the plurality of LED planting units, two adjacent LED planting units connected by the wires, the plurality of LED modules electrically connected by the wires, and the wires configured to output electrical signals to power and control the plurality of LED modules.

8. The LED planting device as claimed in claim 7, wherein the two adjacent LED planting units are connected by a flexible connecting tube, the flexible connecting tube configured to interconnect the two passageways of the two adjacent LED planting units; and wherein the second portion of one of the plurality of LED planting units is connected to the first portion of a next adjacent LED planting unit through the flexible connecting tube, so that the second opening of the LED planting unit is conductive with the first opening of the next adjacent LED planting unit.

9. The LED planting device as claimed in claim 7, wherein the planting device further comprises a control terminal electrically connected to the LED module of the first unit, and the control terminal is configured to control the plurality of LED modules through the wires, respectively.

10. The LED planting device as claimed in claim 7, wherein the planting device further comprises adjusting brackets, wherein each LED planting unit is placed on at least two adjusting brackets, the adjusting brackets configured to adjust a height of the LED planting unit to adapt to heights of plants that are planted;

the adjusting bracket comprising:

a seat;

a hollow supporting post fixed on the seat, an opening arranged on a sidewall of the supporting post;

a telescopic rod sleeved inside the supporting post and sliding relative to the supporting post;

a locking member sleeved around the telescopic rod and in contact with the telescopic rod; and wherein the locking member comprises:

a fixing block received in the opening;

an outer frame sleeved around the supporting post and comprising a rotating shaft arranged at a position thereof corresponding to the opening, wherein a length direction of the rotating shaft is the same as that of the supporting post;

an adjusting rod rotatably connected to the rotating shaft and comprising a convex portion formed close to the opening, and the fixing block arranged between the telescopic rod and the convex portion; and wherein when the adjusting rod rotates, a) the convex portion abuts against the fixing block to press the fixing block onto the telescopic rod so as to fix the telescopic rod; or b) the convex portion is far away from the fixing block so that the fixing block releases from the telescopic rod, so as to move the telescopic rod relative to the adjusting rod, to further adjust a position of the telescopic rod.

11. A planting device comprising:

a plurality of draught fans configured to blow air to form airflow;

a plurality of LED planting units, wherein the number of the plurality of LED planting units is the same as that of the plurality of draught fans, each of the plurality of LED planting units comprising an LED module which comprises a base and a plurality of lighting beads installed on the base, wherein each of the plurality of LED planting units comprises:

an integral tube made of a heat conduction metal material and comprising a hollow passageway and at least one row of air vents arranged on an outer surface of the tube along a length direction thereof, each row of air vents including a plurality of air vents, the plurality of air vents in the same row arranged at intervals;

the LED module installed on the outer surface of the tube and arranged along the length direction of the tube, the base in contact with the tube to conduct heat for the tube; and wherein the tube comprises a first opening and a second opening connected with each other through the passageway and respectively arranged at two ends of the tube, and air that flows from the first opening into the passageway flows out through the air vent and/or the second opening; and wherein each of the plurality of LED planting units comprises a first portion and a second portion, the plurality of LED planting units respectively taken as a first unit, a second unit up to an N-th unit, wherein N is an integer greater than or equal to 1; the plurality of LED planting units successively connected end-to-end; and wherein the draught fan is installed at the first portion, each of the plurality of draught fans corresponding to each first portion one-to-one and configured to blow air towards the passageway through the first opening, a wire connected to each LED planting unit, two adjacent LED planting units connected by the wire, the plurality of LED modules electrically connected to the plurality of draught fans by the wires, and the wires configured to output electrical signals to supply power for the plurality of LED modules and the plurality of draught fans, and control the plurality of LED modules.

12. The planting device as claimed in claim 11, wherein the second portion of one of the plurality of LED planting units is connected to the first portion of a next adjacent LED planting unit through the wire, so that the LED module of the LED planting unit is electrically connected with the LED module of the next adjacent LED planting unit, and the draught fan that is installed on the LED planting unit is electrically connected with the draught fan that is installed on the next adjacent LED planting unit.

13. The planting device as claimed in claim 12, wherein the planting device further comprises a control terminal and a power supply, the control terminal electrically connected to the LED module of the first unit, the plurality of LED modules electrically connected through the wires, the control terminal configured to respectively control the plurality of LED modules through the wires; the power supply electrically connected to the draught fan that is installed on the first unit, the plurality of draught fans electrically connected through the wires, and the power supply configured to respectively control the plurality of draught fans through the wires.

14. The planting device as claimed in claim 11, wherein the planting device further comprises adjusting brackets, wherein each LED planting unit is placed on at least two adjusting brackets, the adjusting brackets configured to adjust a height of the LED planting unit to adapt to heights of plants that are planted;
the adjusting bracket comprising:
a seat;
a hollow supporting post fixed on the seat, an opening arranged on a sidewall of the supporting post;
a telescopic rod sleeved inside the supporting post and sliding relative to the supporting post;
a locking member sleeved around the telescopic rod and in contact with the telescopic rod; and wherein
the locking member comprises:
a fixing block received in the opening;
an outer frame sleeved around the supporting post and comprising a rotating shaft arranged at a position thereof corresponding to the opening, wherein a length direction of the rotating shaft is the same as that of the supporting post;
an adjusting rod rotatably connected to the rotating shaft and comprising a convex portion formed close to the opening, and the fixing block arranged between the telescopic rod and the convex portion; and wherein
when the adjusting rod rotates, a) the convex portion abuts against the fixing block to press the fixing block onto the telescopic rod so as to fix the telescopic rod; or b) the convex portion is far away from the fixing block so that the fixing block releases from the telescopic rod, so as to move the telescopic rod relative to the adjusting rod, to further adjust a position of the telescopic rod.

15. A planting device comprising:
a plurality of pairs of draught fans, each pair of draught fans comprising two draught fans configured to blow air to form airflow;
a plurality of LED planting units, wherein the number of the plurality of draught fans is twice the number of the plurality of LED planting units, each of the plurality of LED planting units comprising an LED module which comprises a base and a plurality of lighting beads installed on the base, wherein each of the plurality of LED planting units comprises:
an integral tube made of a heat conduction metal material and comprising a hollow passageway and at least one row of air vents arranged on an outer surface of the tube along a length direction thereof, each row of air vents including a plurality of air vents, the plurality of air vents in the same row arranged at intervals;
the LED module installed on the outer surface of the tube and arranged along the length direction of the tube, the base in contact with the tube to conduct heat for the tube; and wherein
the tube comprises a first opening and a second opening connected with each other through the passageway and respectively arranged at two ends of the tube, and air that flows from the first opening into the passageway flows out through the air vent and/or the second opening; and wherein
each of the plurality of LED planting units comprises a first portion and a second portion, the plurality of LED planting units respectively taken as a first unit, a second unit up to an N-th unit, wherein N is an integer greater than or equal to 1; the plurality of LED planting units successively connected end-to-end; and wherein
each pair of draught fans corresponds to one of the plurality of LED planting units, one of each pair of draught fans installed on the first portion and the other of each pair of draught fans installed on the second portion, and each pair of draught fans configured to blow air into the passageway; and wherein
a wire is connected to each of the plurality of LED planting units, two adjacent LED planting units connected by the wire, the plurality of LED modules electrically connected to the plurality of pairs of draught fans by the wires, and the wires configured to output electrical signals to supply power for the plurality of LED modules and the plurality of pairs of draught fans, and control the plurality of LED modules.

16. The planting device as claimed in claim 15, wherein the second portion of one of the plurality of LED planting units is connected to the first portion of a next adjacent LED planting unit through the wire, so that the LED module of the LED planting unit is electrically connected with the LED module of the next adjacent LED planting unit, and the draught fan that is installed on the LED planting unit is electrically connected with the draught fan that is installed on the next adjacent LED planting unit.

17. The planting device claimed in claim 16, wherein the planting device further comprises a control terminal and a power supply, the control terminal electrically connected to the LED module of the first unit, the plurality of LED modules electrically connected through the wires, the control terminal configured to respectively control the plurality of LED modules through the wires; the power supply electrically connected to the draught fan that is installed on the first unit, the plurality of pairs of draught fans electrically connected through the wires, and the power supply configured to respectively control the plurality of pairs of draught fans through the wires.

18. The planting device as claimed in claim 15, wherein the planting device further comprises adjusting brackets, wherein each LED planting unit is placed on at least two adjusting brackets, the adjusting brackets configured to adjust a height of the LED planting unit to adapt to heights of plants that are planted;
the adjusting bracket comprising:
a seat;
a hollow supporting post fixed on the seat, an opening arranged on a sidewall of the supporting post;
a telescopic rod sleeved inside the supporting post and sliding relative to the supporting post;
a locking member sleeved around the telescopic rod and in contact with the telescopic rod; and wherein
the locking member comprises:
a fixing block received in the opening;
an outer frame sleeved around the supporting post and comprising a rotating shaft arranged at a position thereof corresponding to the opening, wherein a length direction of the rotating shaft is the same as that of the supporting post;
an adjusting rod rotatably connected to the rotating shaft and comprising a convex portion formed close to the opening, and the fixing block arranged between the telescopic rod and the convex portion; and wherein
when the adjusting rod rotates, a) the convex portion abuts against the fixing block to press the fixing block onto the telescopic rod so as to fix the telescopic rod; or b)

the convex portion is far away from the fixing block so that the fixing block releases from the telescopic rod, so as to move the telescopic rod relative to the adjusting rod, to further adjust a position of the telescopic rod.

* * * * *